D. C. Talbot's Fishing-Tackle.
75075
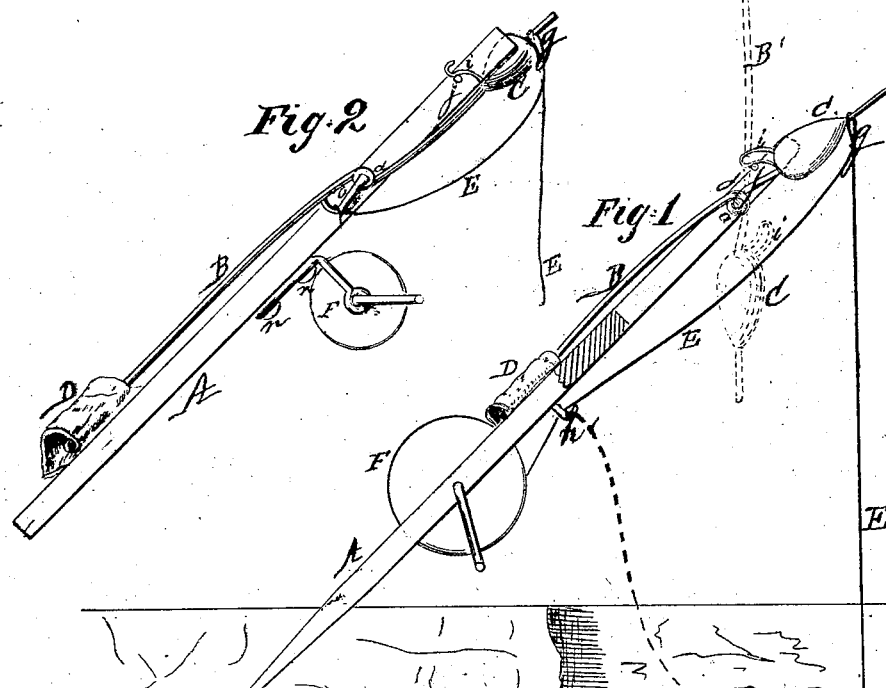
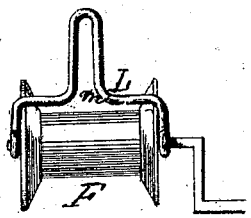
PATENTED
MAR 3 1868
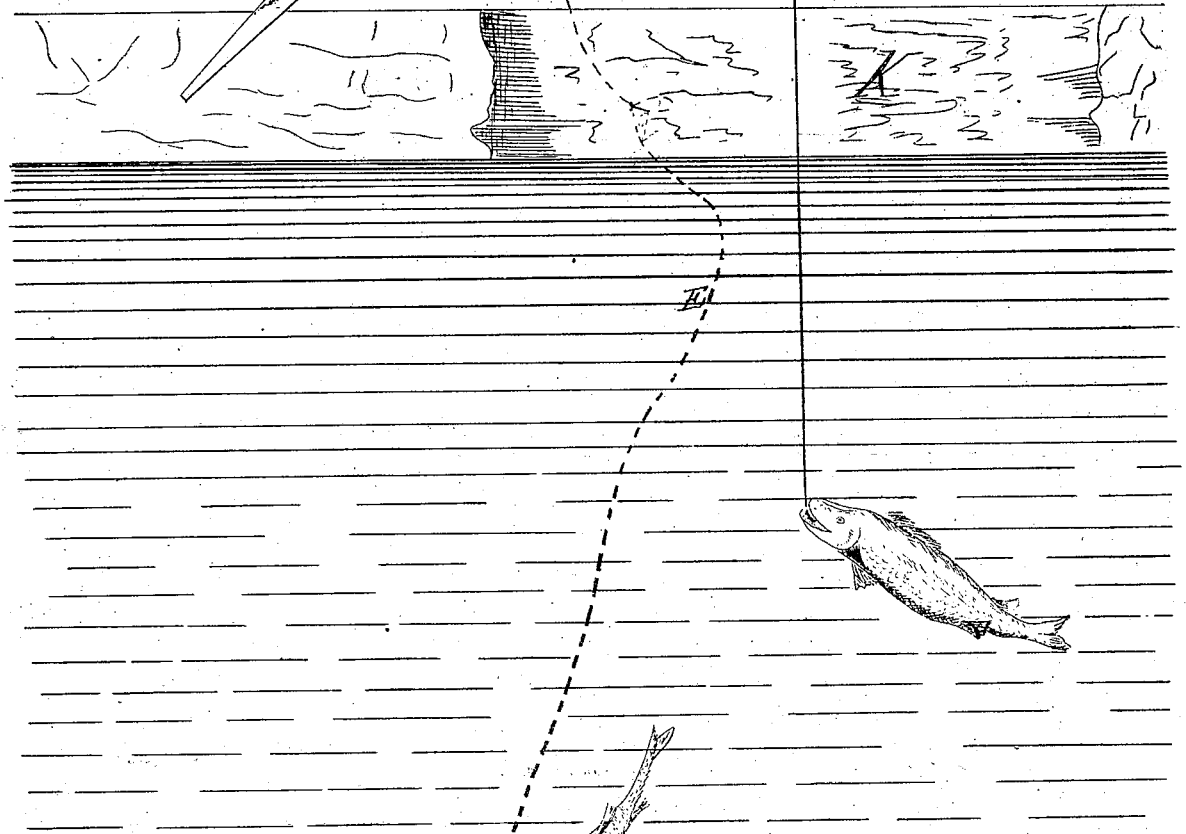
Witnesses
W. L. Ashkettle
J. Fraser
Inventor:
D. C. Talbot
per [attorney signature]
Attorney

United States Patent Office.

D. C. TALBOT, OF HOLDEN, MASSACHUSETTS.

Letters Patent No. 75,075, dated March 3, 1868.

IMPROVEMENT IN FISHING-TACKLE.

The Schedule referred to in these Letters Patent and making part of the same.

TO ALL WHOM IT MAY CONCERN:

Be it known that I, D. C. TALBOT, of Holden, in the county of Worcester, and State of Massachusetts, have invented new and useful Improvements in Fishing-Tackle; and I do hereby declare that the following is a full, clear, and exact description thereof, which will enable others skilled in the art to make and use the same, reference being had to the accompanying drawings forming part of this specification.

This invention relates to new and useful improvements in tackle for catching fish, whereby the line may be set and notice given when a fish has taken the hook, and it consists in so arranging the apparatus that it may be used in either winter or summer, and in connecting the line with a signal-flag and weight, in the manner hereinafter described.

Figure 1 is a longitudinal view of the apparatus, showing it as set for the fish, and also as when sprung and the signal-flag raised.

Figure 2 shows a modification of the same, which may be used without a reel, with the line connected with the pole in a manner different from the other.

Figure 3 is a view of a detachable reel.

Similar letters of reference indicate corresponding parts.

A represents the pole; B B' is the flag-staff, which is pivoted to the pole at $a$; C is a weight on the end of the flag-staff; D is the signal-flag; E is the line; F is the reel. When the apparatus is set, the flag-staff will lie in contact with the pole, as seen at B. $g$ is a loop in the line, which is slipped over the end of the staff B, or over a wire on the weight, from which it is passed through the staple $h$ and on to the reel, (see fig. 1.) The flag-staff, when the line is set, is held in position by a small spring, $i$, which catches over a pin, $j$, on the pole, as seen in the drawing. When a fish takes the hook and pulls upon the line, the end of the flag-staff is drawn down, the spring $i$ slips off from the pin $j$, and the loop $g$ slips off the end of the staff as the weight drops, when the flag-staff assumes an upright position, as seen, giving the desired signal. In this position the line will be unwound from the reel by the fish running with the hook, as seen. In setting the apparatus, the pole is placed at an angle of about forty-five degrees, as seen in the drawing. In winter fishing, a hole is cut in the ice, as seen at K, and the pole is supported from another hole cut in the ice, as represented. For summer fishing, the pole is supported from a hole bored in a plank or piece of wood, or in any convenient manner. L (fig. 3) is a bail or long loop attached to the shaft of the reel, by which the reel is connected to the pole, as seen in fig. 2. The attachment is made by slipping the open end of the loop $m$ under the heads of the screws $n\,n$. The line is attached directly to the pole by the hook seen at $o$. The arrangement of the tackle otherwise is the same as in fig. 1. The object is to use the tackle without the reel when it is desirable to do so, making the apparatus thereby lighter and cheaper.

Having thus described my invention, what I claim as new, and desire to secure by Letters Patent, is—

The arrangement of the weight C, the loop $g$, the spring $i$, and the pin $j$, in combination with a signal-flag and staff and fishing-pole, substantially as described and for the purposes set forth.

In combination with a fishing-pole or tackle, the flag-staff B (with the weight C,) when attached to the pole and operated substantially as described, either with or without a reel.

The above specification of my invention signed by me, this 22d day of January, 1868.

D. C. TALBOT.

Witnesses:
F. H. DEWEY,
G. H. ALLEN.